(12) United States Patent
Pavillet et al.

(10) Patent No.: US 9,494,173 B2
(45) Date of Patent: Nov. 15, 2016

(54) DEVICE FOR CONTROLLING THE MOVEMENT OF A RING GATE OF A HYDRAULIC MACHINE AND HYDRAULIC MACHINE COMPRISING SUCH A DEVICE

(75) Inventors: Robert Pavillet, Grenoble (FR); Armin Steinhilber, Claix (FR)

(73) Assignee: ALSTOM Renewable Technologies, Grenoble (FR)

( * ) Notice: Subject to any disclaimer, the term of this patent is extended or adjusted under 35 U.S.C. 154(b) by 1150 days.

(21) Appl. No.: 13/579,021

(22) PCT Filed: Jan. 20, 2011

(86) PCT No.: PCT/FR2011/050105
§ 371 (c)(1),
(2), (4) Date: Jan. 10, 2013

(87) PCT Pub. No.: WO2011/089361
PCT Pub. Date: Jul. 28, 2011

(65) Prior Publication Data
US 2013/0098237 A1    Apr. 25, 2013

(30) Foreign Application Priority Data
Jan. 21, 2010   (FR) ..................................... 10 50400

(51) Int. Cl.
*F15B 11/22* (2006.01)
*F15B 15/20* (2006.01)
*F03B 3/18* (2006.01)

(52) U.S. Cl.
CPC ............... *F15B 15/20* (2013.01); *F03B 3/183* (2013.01); *F15B 11/22* (2013.01); *F05B 2260/76* (2013.01);
(Continued)

(58) Field of Classification Search
CPC ........... F03B 3/183; F15B 11/22; F15B 15/20; F15B 2211/782
See application file for complete search history.

(56) References Cited

U.S. PATENT DOCUMENTS

| 4,409,884 A * | 10/1983 | Boehringer ............. F15B 11/22 91/171 |
| 4,434,964 A | 3/1984 | Hudon |
| 4,448,389 A * | 5/1984 | Hudon .................. F03B 11/004 251/144 |

FOREIGN PATENT DOCUMENTS

| CN | 200978844 Y | 11/2007 | |
| DE | 19709474 A1 * | 9/1998 | ................ B66F 7/20 |

(Continued)

OTHER PUBLICATIONS

International Search Report dated Jun. 17, 2011 for International Application No. PCT/FR2011/050105.
(Continued)

*Primary Examiner* — Thomas E Lazo
*Assistant Examiner* — Abiy Teka
(74) *Attorney, Agent, or Firm* — Dority & Manning, P.A.

(57) ABSTRACT

A device controls the movement of a ring gate of a hydraulic machine between an open position and a blockage position. The device includes at least four cylinders, the rods of which are suitable for being connected to the ring gate at locations located on a perimeter of the ring gate. The device also includes at least two hydraulic members for synchronizing pistons, the hydraulic synchronization members being connected to the cylinders such as to form at least two groups. Each group encompasses at least two cylinders connected by at least one hydraulic synchronization member, two cylinders belonging to two separate groups not being connected by a hydraulic synchronization member.

12 Claims, 5 Drawing Sheets

(52) U.S. Cl.
CPC .. *F05B 2270/604* (2013.01); *F15B 2211/3059* (2013.01); *F15B 2211/40538* (2013.01); *F15B 2211/6336* (2013.01); *F15B 2211/665* (2013.01); *F15B 2211/7121* (2013.01); *F15B 2211/7142* (2013.01); *F15B 2211/782* (2013.01); *Y02E 10/223* (2013.01)

(56) References Cited

FOREIGN PATENT DOCUMENTS

| | | | | |
|---|---|---|---|---|
| FR | 2 119 290 A5 | 8/1972 | | |
| NL | WO 9320354 A1 * | 10/1993 | ............... | B66F 7/20 |
| WO | 99/43954 A1 | 9/1999 | | |
| WO | WO 9943954 A1 * | 9/1999 | ............ | F03B 11/004 |

OTHER PUBLICATIONS

Office Action (Text of First Office Action) issued on Jul. 28, 2014, by the State Intellectual Property Office of The People's Republic of China in corresponding Chinese Patent Application No. 201180007079.5. (20 pages).

* cited by examiner

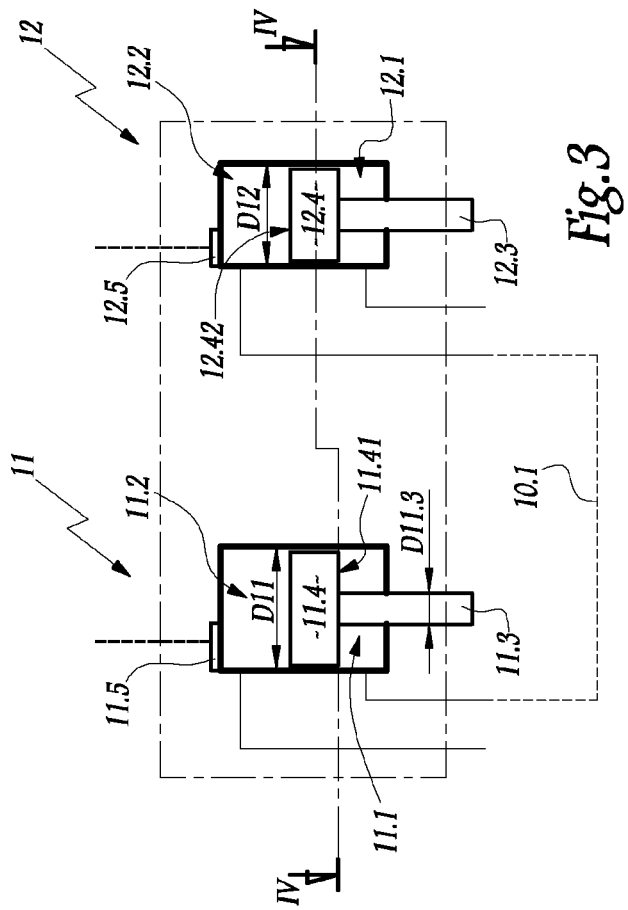
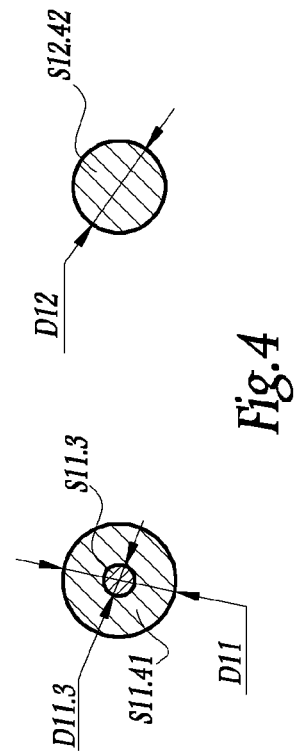
Fig.3
Fig.4
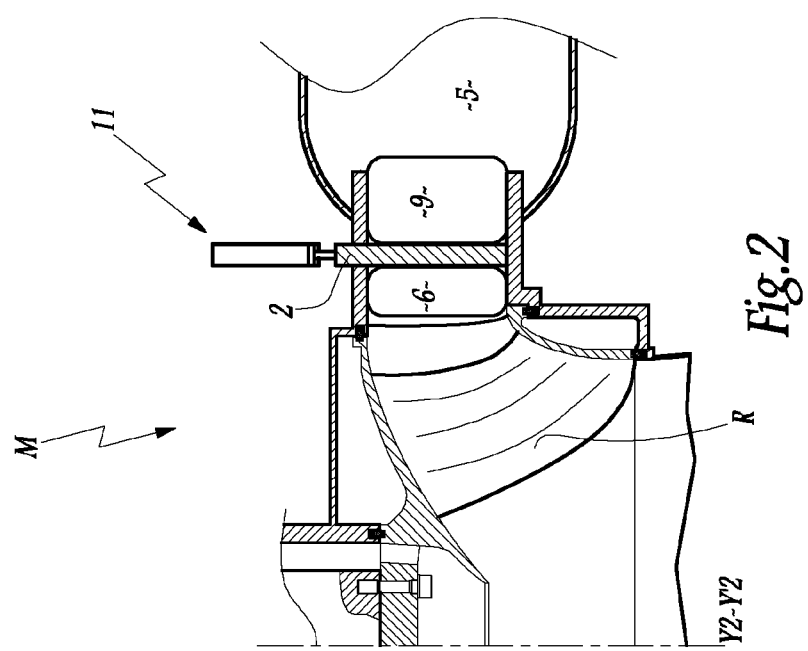
Fig.2

DEVICE FOR CONTROLLING THE MOVEMENT OF A RING GATE OF A HYDRAULIC MACHINE AND HYDRAULIC MACHINE COMPRISING SUCH A DEVICE

CROSS REFERENCE TO RELATED APPLICATIONS

This application is the U.S. National Phase of International Application No. PCT/FR2011/050105, filed Jan. 20, 2011, designating the U.S. and published as WO 2011/089361 on Jul. 28, 2011 which claims the benefit of French Patent Application No. 10 50400 filed Jan. 21, 2010.

FIELD OF THE INVENTION

The present invention relates to a device for controlling the movement of a ring gate of a hydraulic machine. Furthermore, the present invention relates to a hydraulic machine comprising such a device. The present invention may in particular be applied to turbines, pumps, or pump impellers.

BACKGROUND OF THE INVENTION

A hydraulic machine of the prior art comprises a paddle wheel and a ring gate to control the supply of water for the paddle wheel. The ring gate can move between an open position and a blockage position of a water supply channel for the ring gate. The movement of the ring gate between its open and blockage positions is controlled by an electrohydraulic control device.

A control device of the prior art includes dual-action hydraulic cylinders each comprising a rod and a piston that separates two chambers adapted to receive an actuating fluid of the cylinder. Such a control device also requires mechanical components to synchronize the movements of the cylinder pistons. In particular, among the mechanical components associated with each cylinder, a reversible screw-nut pair converts the translation of the piston and the rod into rotation of a pinion outside the cylinder. Furthermore, a transmission chain connects the pinions to one another so as to synchronize their rotations and subsequently synchronize the translations of the pistons of the different cylinders.

However, this control device comprises several mechanical components for each cylinder that require delicate adjustments and tedious maintenance operations.

SUMMARY OF THE INVENTION

The present invention in particular aims to resolve these drawbacks, by proposing a reliable control device that is easy to adjust.

To that end, the present invention relates to a device, which controls the movement of a ring gate of a hydraulic machine comprising a paddle wheel, the ring gate defining a closed contour and being movable between an open position and a blockage position of at least one water supply channel of the paddle wheel, the device comprising at least four dual-action hydraulic cylinders, each cylinder comprising:
  a rod,
  a piston,
  a first chamber, and
  a second chamber,
the first chamber and the second chamber being suitable for receiving an actuating fluid, the piston being connected to the rod so as to separate the first chamber from the second chamber, the first chamber being situated on the side of the rod relative to the piston and the second chamber being situated on the side opposite the rod relative to the piston, the rods being suitable for being connected to the ring gate at locations located on a perimeter adapted to coincide with the contour of the ring gate.

The device also includes at least two hydraulic members for synchronizing the distances traveled by the piston in the main direction of movement of the ring gate, the hydraulic synchronization members being connected to the cylinder so as to form at least two separate groups of cylinders, each group encompassing at least two cylinders connected by at least one hydraulic synchronization member, two cylinders belonging to two distinct groups not being connected by a hydraulic synchronization member.

A control device according to the invention therefore makes it possible to synchronize the cylinders effectively.

According to other advantageous, but optional features of the invention, considered alone or according to any technically possible combination:
  the locations are distributed on the perimeter so that the stiffness of the ring gate contributes to synchronizing the distances traveled by the pistons belonging to separate groups, in the main direction of movement of the ring gate;
  at least one hydraulic synchronization member includes a duct arranged to serially connect at least two cylinders belonging to a same group, i.e. a first cylinder and a second cylinder, said hydraulic synchronization member being adapted for the actuating fluid to flow from the first chamber of a first cylinder toward the second chamber of a second cylinder, the second cylinder being consecutive to the first cylinder in their group, the area of the surface of the piston delimiting the first chamber of the first cylinder being approximately equal to the area of the surface of the piston delimiting the second chamber of the second cylinder;
  the number of cylinders is comprised between 5 and 30;
  the groups encompass the same number of cylinders;
  the device comprises at least three groups of cylinders, and each group encompasses two cylinders;
  two consecutive locations on said perimeter correspond to cylinders belonging to two separate groups;
  the locations are uniformly distributed on said perimeter, said perimeter is in the shape of a circle, and the locations corresponding to the two cylinders of a group are diametrically opposite;
  the first chamber and the second chamber of each cylinder are generally in the shape of cylinders with circular bases;
  for a first cylinder and a second cylinder belonging to a same group, the difference between the square of the inner diameter of the first cylinder and the square of the inner diameter of the second cylinder is equal to the square of the diameter of the rod of the first cylinder;
  the device also comprises a steering unit and discrete supply means and/or discrete discharge means for an actuating fluid for each cylinder, each cylinder is equipped with at least one sensor suitable for emitting signals representative of the position of the corresponding piston in the direction of actuation of the cylinder, the steering unit being arranged to collect said signals and being capable of steering the discreet supply means and/or discrete discharge means taking into account position deviations, in the main direction of movement of the ring gate, between cylinders belonging to a same group; and the device also comprises continuous supply means and/or continuous discharge means for an actuating fluid of the cylinders and the steering unit is adapted to steer the continuous supply means and/or continuous discharge means taking into account the position deviations between cylinders belonging to separate groups.

Furthermore, the present invention relates to a hydraulic machine, of the turbine, pump, or paddle wheel pump type, comprising an a paddle wheel and a ring gate movable between an open position and a blockage position of at least one water supply channel of the paddle wheel, the hydraulic machine being characterized in that it also comprises a device as previously described.

BRIEF DESCRIPTION OF DRAWINGS

The present invention will be well understood, and the advantages thereof will also emerge in light of the following description, provided solely as a non-limiting example and done in reference to the appended drawings, in which:

FIG. 2 is a cross-section of a hydraulic machine according to the invention comprising the device of FIG. 1;

FIG. 3 is a larger scale view of detail Ill in FIG. 1;

FIG. 4 is a cross-section along arrows IV-IV in FIG. 3;

DETAILED DESCRIPTION OF THE EMBODIMENTS

Figure 1:
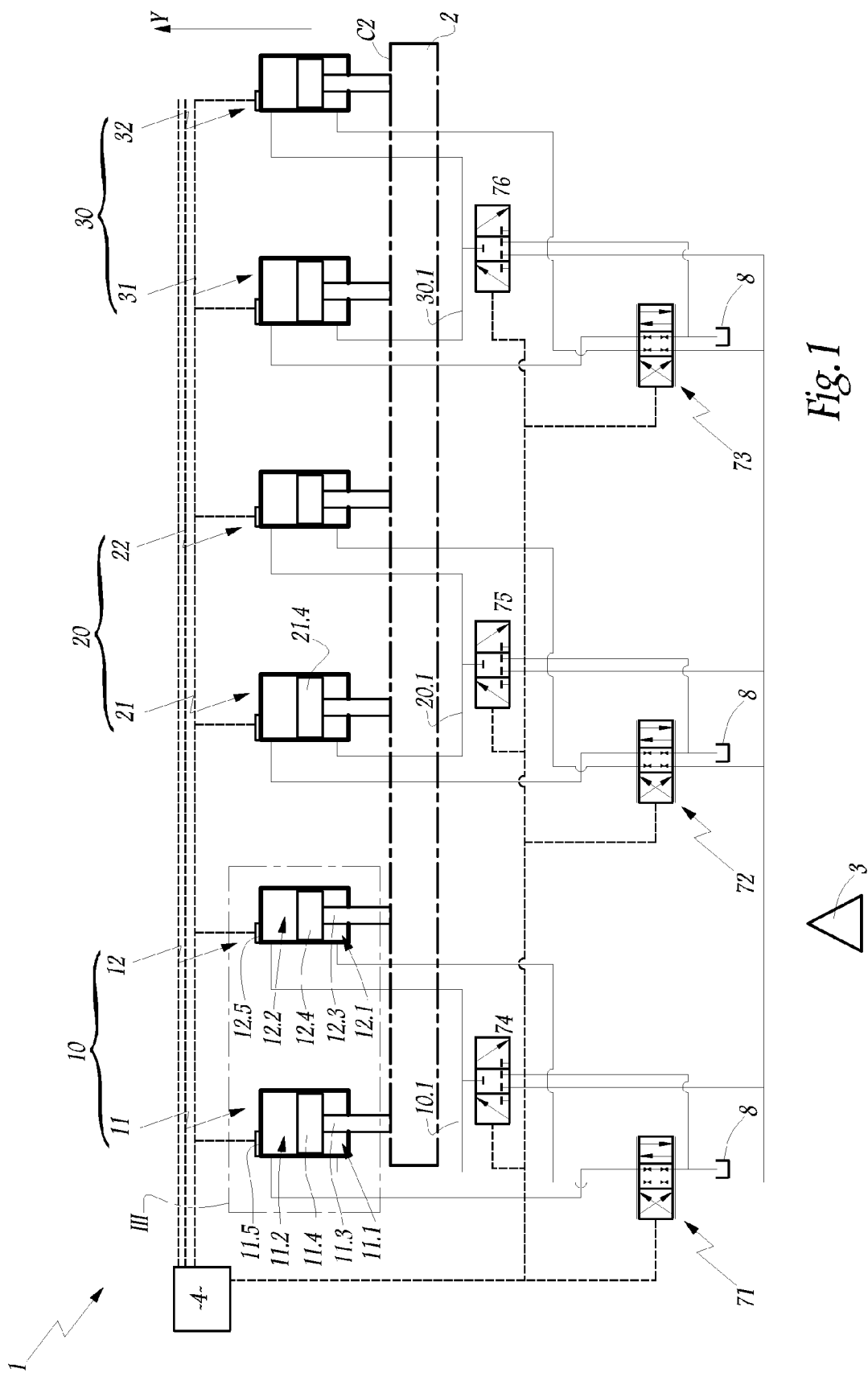
FIG. 1 is a diagrammatic view of a device according to a first embodiment the invention.
Figure 6:
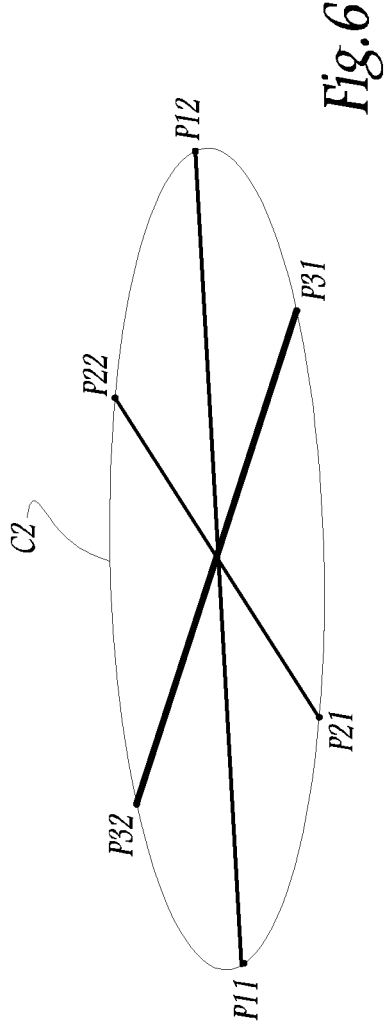
FIG. 6 is a diagrammatic view of the ring gate, in a static phase, diagrammed in FIG. 1.

FIG. 1 shows a device 1 for controlling the movement of the ring gate 2. The ring gate 2 is diagrammed in broken lines in FIG. 1 and shown in perspective view in FIG. 6. The ring gate 2 overall defines a closed contour, as shown in FIG. 6. In other words, the ring gate 2 has a globally annular shape. In the example of FIG. 6, the ring gate 2 is in the form of a cylindrical ring with a circular base and axis Y2-Y'2 visible in FIG. 2. The ring gate 2 is diagrammed in FIG. 1 as an evolute to facilitate the reading of FIG. 1.

As shown in FIG. 2, a hydraulic machine M according to the invention comprises a paddle wheel R, the ring gate 2 and the device 1. The ring gate 2 moves in a main direction Y, which is vertical and parallel to the axis Y2-Y'2 in the example of the figures. The ring gate 2 can be moved between an open position and a blockage position (FIG. 2) of a water supply channel 5 of the paddle wheel R. In the case of the hydraulic machine M, which may be of the turbine, pump, or paddle wheel pump type, the channel 5 is formed by a shell called a "tank." The ring gate 2 was installed between fixed guide vanes 9 and movable wicket gates 6 used to orient the flow of water toward the paddle wheel R.

As shown in FIGS. 1 and 2, the device 1 comprises six dual-action hydraulic cylinders 11, 12, 21, 22, 31 and 32, each comprising:

a rod 11.3, 12.3 or equivalent means;
a piston 11.4, 12.4 or equivalent means;
a first chamber 11.1, 12.1 or equivalent means; and
a second chamber 11.2, 12.2 or equivalent means.

Inasmuch as the cylinders 11, 21 and 31, on the one hand, and the cylinders 12, 22 and 32, on the other hand, are similar or identical, only the cylinders 11 and 12 will be described in detail below. The description of the cylinders 11 and 12 provided below relative to the figures can be transposed to the cylinders 21, 22, 31 and 32.

Since the cylinders 11 and 12 are dual-action hydraulic cylinders, their first chambers 11.1 and 12.1 and their second chambers 11.2 and 12.2 are adapted to receive an actuating fluid, such as oil. The pistons 11.4 and 12.4 have globally flat surfaces. Each piston 11.4 or 12.4 is connected to the corresponding rod 11.3 or 12.3 so as to separate the first respective chamber 11.1 or 12.1 from the second respective chamber 11.2 or 12.2.

The first chamber 11.1 or 12.1 and the second chamber 11.2 or 12.2 of each cylinder 11 and 12 are globally in the shape of cylinders with circular bases. Likewise, the rod 11.3 is cylindrical. Each first chamber 11.1 or 12.1 is situated, relative to the piston 11.4 or 12.4, on the side of the corresponding rod 11.3 or 12.3, while each second chamber 11.2 or 12.2 is located, relative to the piston 11.4 or 12.4, on the side opposite the corresponding rod 11.3 or 12.3. In other words, the rod 11.3 or 12.3 partially penetrates the first respective chamber 11.1 or 12.1, while the second chamber 11.2 or 12.2 only contains actuating fluid.

The rods 11.3, 12.3 and equivalent means are adapted to be connected to the ring gate 2 at locations P11, P12, P21, P22, P31 and P32 located on a perimeter C2 coinciding with the contour of the ring gate 2. In this application, the verb "connect" relates to a mechanical connection.

In the case at hand, one end of each rod 11.3 or 12.3 is directly fastened to the circular contour of the ring gate 2. Inasmuch as the perimeter C2 on which the locations P11, P12, P21, P22, P31 and P32 are located for connections between the rods 11.3, 12.3 and equivalent means and the ring gate 2 is adapted to coincide with the circular contour of the ring gate 2, said perimeter C2 is also circular.

The device 1 includes three ducts 10.1, 20.1 and 30.1 that are arranged to serially connect two respective cylinders 11 and 12, 21 and 22, or 31 and 32. In this way, the duct 10.1 serially connects the cylinders 11 and 12. The duct 20.1 serially connects the cylinders 21 and 22. The duct 30.1 serially connects the cylinders 31 and 32.

In this application, the verbs " attach," "link," "connect" and "join," as well as their derivatives, mean "put in hydraulic communication." The adjective "hydraulic" may refer to an actuating fluid of the cylinders, such as oil, or water flowing in hydraulic machine.

The duct 10.1 forms a hydraulic synchronization member, as it makes it possible to synchronize the distances traveled by the pistons 11.4 and 12.4 in direction Y. The maximum distance the piston 11.4 can travel in direction Y corresponds to the total travel of the piston 11.4 in the cylinder 11. Like the duct 10.1, each duct 20.1 or 30.1 makes it possible to synchronize the distances traveled by the pistons of the cylinders 21 and 22, on the one hand, and 31 and 32, on the other hand, in direction Y. In the example of the figures, the pistons 11.4, 12.4 and equivalent means move in parallel and in the same direction in direction Y.

The hydraulic synchronization members formed by the ducts 10.1, 20.1 and 30.1 are connected to the cylinders 11, 12, 21, 22, 31 and 32 so as to form three separate groups 10, 20 and 30. Each group 10, 20 or 30 in this case encompasses two cylinders 11 and 12, 21 and 22, or 31 and 32. In this way, two cylinders 11 and 12, 21 and 22, or 31 and 32 belonging to a same group 10, 20 or 30 are serially connected by a respective duct 10.1, 20.1 or 30.1. However, two cylinders 11-21, 12-22 belonging to separate groups 10, 20 are not connected by a duct 10.1, 20.1 or 30.1. The synchronization mode specific to the example in the figures will be described in detail below In this application, the term "group" designates an assembly encompassing at least two cylinders connected by at least one hydraulic synchronization member. The groups 10, 20 and 30 encompass the same number of cylinders, i.e. two each. The device 1 comprises three groups 10, 20 and 30 that each encompass two cylinders 11 and 12, 21 and 22, 31 and 32.

Figure 5:
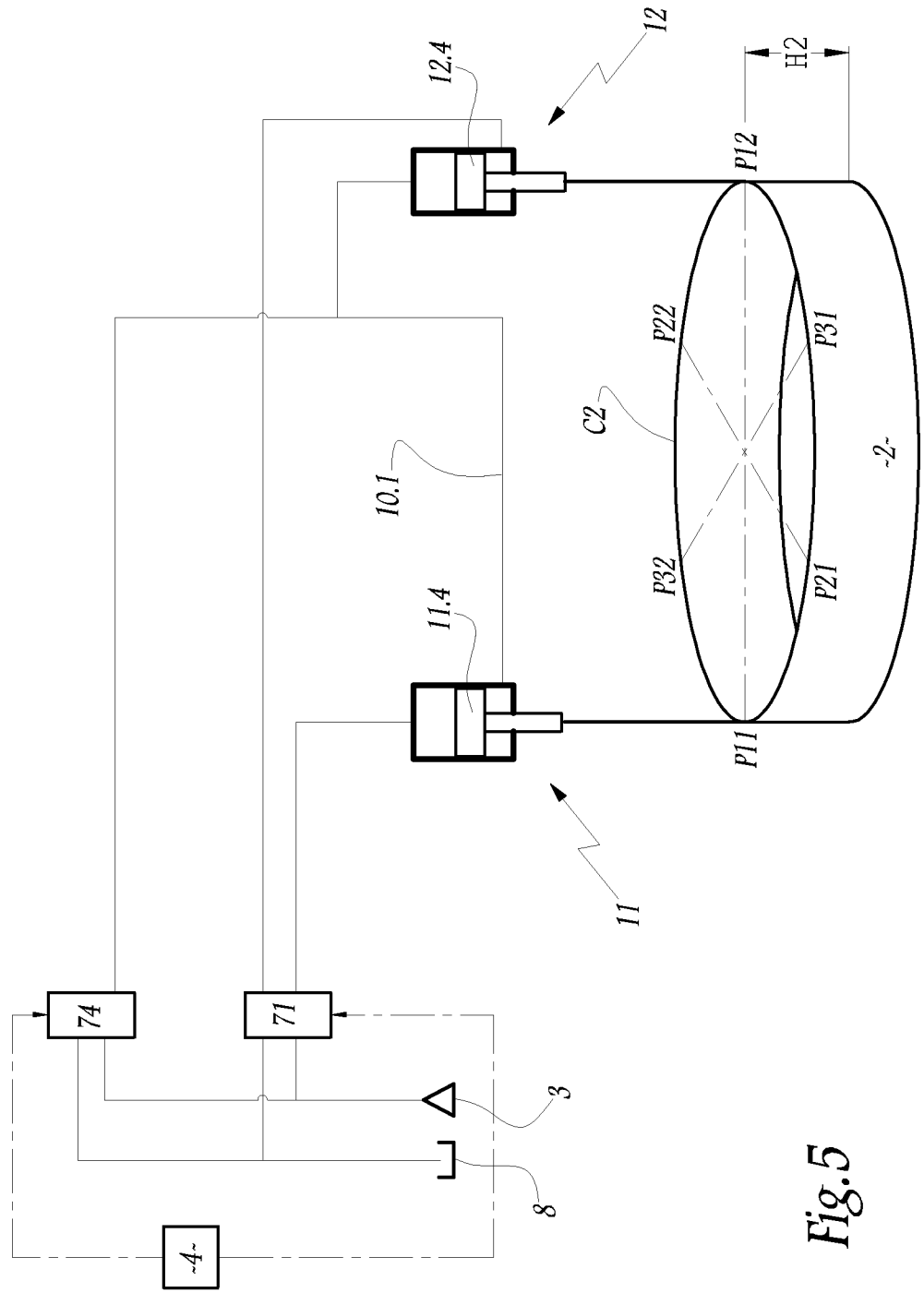
FIG. 5 is a partial perspective diagrammatic view of part of the control device of FIG. 1.
Figure 7:
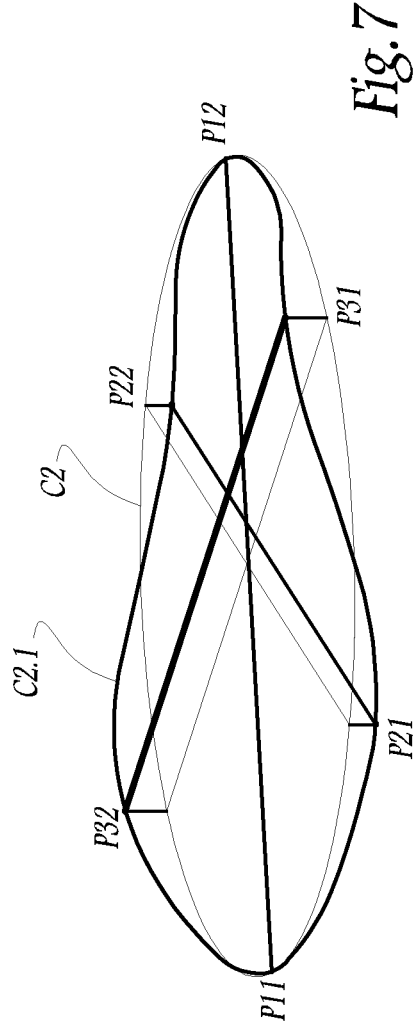
FIG. 7 is a view similar to FIG. 6 illustrating the ring gate of FIG. 6 in a dynamic phase.

Furthermore, as shown in FIGS. 5, 6 and 7, the locations P11, P12, P21, P22, P31 and P32 corresponding to the cylinders 11, 12, 21, 22, 31 and 32 are distributed on the perimeter C2 such that the stiffness of the ring gate 2 contributes to synchronizing the distances traveled, in direction Y, by the pistons, for example 11.4 and 21.4, which belong to separate groups 10, 20 and 30.

On the perimeter C2, two consecutive locations correspond to cylinders belonging to two separate groups 10, 20 and 30. In this way, the locations P11 and P21 correspond to the cylinders 11 and 21 that respectively belong to the group 10 and the group 20. Such a sequence makes it possible to alternate the locations P11, P12, P21, P22, P31 and P32, which contributes to synchronizing the pistons of the cylinders as described below.

In the example of FIGS. 5 to 7, the locations P11, P12, P21, P22, P31 and P32 are uniformly distributed on the perimeter C2. In other words, two consecutive locations P11 and P21 are separated by an angle of 60° at the center of the circular perimeter C2. Furthermore, the locations corresponding to the two cylinders of each of the groups 10, 20 and 30 are diametrically opposite on the perimeter C2. For example, the locations P11 and P12 corresponding to the cylinders 11 and 12 of the group 10 are diametrically opposite. Such a distribution of the locations corresponding to the cylinders allows effective mechanical synchronization through the stiffness of the ring gate 2.

In FIG. 1, the two cylinders of each group 10, 20 or 30 are diagrammed in adjacent locations. However, the purpose of FIG. 1 is to diagram the electric and hydraulic circuits of the device 1, not to show the actual locations of the cylinders or components of the device 1 relative to the ring gate 2. These actual locations are shown in FIGS. 2 and 5 to 7. For clarity in FIG. 5, only cylinders 11 and 12 are illustrated.

FIG. 6 symbolizes the contour of the ring gate 2 coinciding with the perimeter C2, when the cylinders are in a static phase, i.e. when the ring gate 2 is not in motion because it is placed in the open position or in the blockage position. FIG. 7 symbolizes the perimeter C2 when the cylinders are in a dynamic phase, i.e. when the ring gate 2 is in motion.

In the dynamic phase, the upper contour of the ring gate 2 coinciding with the perimeter C2 becomes deformed, the deformation being shown in FIG. 7 by a perimeter C2.1. To understand FIG. 7, the perimeter C2.1 illustrates a deformation of the perimeter C2 in an amplified manner. In fact, according to the forces applied on the ring gate 2 by the outside elements, for example by the hydraulic forces and by the frictional forces, the cylinders are not perfectly synchronized, but on the contrary have deviations between groups 10, 20 and 30. Thus, in the rising direction of the ring gate 2, the cylinders 31 and 32 may be "in advance," while the cylinders 21 and 22 may be "lagging behind" relative to the cylinders 11 and 12.

Inasmuch as the locations P11, P12, P21, P22, P31 and P32 are distributed on the perimeter C2, the stiffness of the ring gate 2 ensures mechanical synchronization of the distances traveled by the pistons such as 11.4 and 21.4 belonging to separate groups 10, 20 and 30. The stiffness of the ring gate 2 is determined by its dimensions and by the elasticity of the material from which it is made.

The diameter of the perimeter C2 corresponding to the ring gate 2 can for example be between 2 m and 15 m. The material making up the ring gate 2 may for example be a steel. The height H2 of the ring gate 2, measured in direction Y, can be comprised between 0.25 m and 3 m. The thickness of the ring gate 2, measured in a radial direction orthogonal to the direction Y, may be between 30 mm and 300 mm.

In other words, the stiffness of the ring gate 2 tends to return the perimeter C2.1 of the dynamic phase deformation to the vicinity of the perimeter C2 coinciding with the contour of the ring gate 2 in the static phase, opposing the forces that caused the deformation of the ring gate 2. The stiffness of the ring gate 2 contributes to synchronizing the cylinders of the separate groups 10, 20 and 30. In the example of FIG. 7, the stiffness of the ring gate 2 "brakes" the cylinders 31 and 32 that are in advance, and "accelerates" the cylinders 21 and 22 that are lagging behind relative to the cylinders 11 and 12.

The hydraulic synchronization between cylinders of a same group is described below relative to FIGS. 1 to 4, in particular between the cylinders 11 and 12. When the ring gate 2 moves in direction Y and in the descending direction, the actuating fluid circulates from the first cylinder 11 to the second cylinder 12. The terms "first" and "second" are chosen arbitrarily to designate the two consecutive cylinders of a same group.

The duct 10.1, or hydraulic synchronization member, is suitable for the flow of actuating fluid between the first chamber 11.1 of the first cylinder 11 and the second chamber 12.2 of the second cylinder 12. The second cylinder 12 is adjacent to the first cylinder 11 in the group 10. In other words, the duct 10.1 connects a discharge/supply opening of the first chamber 11.1 of the first cylinder 11 to a supply/discharge opening of the second chamber 12.2 of the second cylinder 12.

Furthermore, as shown in FIGS. 3 and 4, the area S11.41 of the surface 11.41 of the piston 11.4 that delimits the first chamber 11.1 of the first cylinder 11 is approximately equal to the area S12.42 of the surface 12.42 of the piston 12.4 delimiting the second chamber 12.2 of the second cylinder 12. The areas S11.41 and S12.42 respectively correspond to the flow cross-sections of the first chamber 11.1 of the cylinder 11 and the second chamber 12.2 of the cylinder 12.

In the present application, the term "approximately" accounts for the machining allowances of the parts making up the cylinders. Equality between the surface areas S11.41 and S12.42 is obtained by dimensioning the cylinders 11 and 12 according to the following relationship:

$$D11^2 = D12^2 + D11.3^2 \qquad (1)$$

where:
D11 is the inner diameter of the cylinder 11,
D12 is the inner diameter of the cylinder 12, and
D11.3 is the diameter of the rod 11.3.

The inner diameter D11 of the cylinder 11 is therefore larger than the inner diameter D12 of the cylinder 12.

More generally, for a first cylinder and a second cylinder belonging to a same group, in particular a group including more than two cylinders, the difference between the square of the inner diameter of the first cylinder and the square of the inner diameter of the second cylinder is equal to the square of the diameter of the rod of the first cylinder.

As shown in FIG. 4, the surface 11.41 is in the shape of a crown, and the surface 12.42 is in the shape of a solid disc. The area S11.41 is equivalent to:

$$S11.41=\pi(D11)^2/4-\pi(D11.3)^2/4 \quad (2)$$

Futhermore, the area S12.42 is equivalent to:

$$S12.42=\pi(D12)^2/4 \quad (3)$$

The equality between the areas S11.41 and S12.42 allows the pistons 11.4 and 12.4 of the cylinders 11 and 12 to travel the same distance when a volume of actuating fluid is transferred from the cylinder 11 to the cylinder 12 by the duct 10.1, which forms a hydraulic synchronization member of the pistons 11.4 and 12.4.

Furthermore, the device 1 includes a steering unit 4, three proportional distributors 71, 72 and 73, and three distributors 74, 75 and 76. Each proportional distributor 71, 72 or 73 is connected to a respective group 10, 20 or 30. Each proportional distributor 71, 72 or 73 has four inlets and three positions. The steering unit 4 and the proportional distributors 71, 72 and 73 make it possible to control the flows of actuating fluid between a hydraulic fluid source 3, the cylinders 11, 12, 21, 22, 31 and 32, and a collector or drain 8.

During operation, to move the ring gate 2 in the descending direction, the steering unit 4 steers the proportional distributors 71, 72 and 73 so that the actuating fluid flows from the source 3 toward the second chambers 11.2 and equivalent means of the first cylinders 11, 21 and 31. At the same time, the actuating fluid present in the first chambers 11.1 and equivalent means of the "first" cylinders 11, 21 and 31 flows in the ducts 10.1, 20.1 and 30.1, respectively, toward the second chambers 12.2 and equivalent means of the "second" cylinders 12, 22 and 32. The ducts 10.1, 20.1 and 30.1 thus perform their function as hydraulic synchronization members of the pistons 11.4, 12.4 and equivalent means. Each duct 10.1, 20.1 or 30.1 synchronizes two pistons 11.4 and 12.4 of cylinders belonging to a same group 10, 20 or 30.

To move the ring gate 2 in the rising direction, the steering unit 4 steers the proportional distributors 71, 72 and 73 so that the actuating fluid flows in the opposite directions relative to the descent of the ring gate 2 described above.

As shown in FIGS. 1 and 5, the device 1 also comprises distributors 74, 75 and 76 respectively connected to each duct 10.1, 20.1 and 30.1. The distributors 74, 75 and 76 are connected to the source 3 and the drain 8. In each group 10, 20 or 30, the respective distributor 74, 75 or 76 serves as discrete supply means and/or discrete discharge means for the actuating fluid for each cylinder 11 and 12 and equivalent means.

In this application, the term "discrete" applies to the supply or discharge flow of small volumes of actuating fluid, as opposed to "continuous" flows of a significant volume of actuating fluid. A "continuous" supply means and/or "continuous" discharge means for the actuating fluid is implemented to move the ring gate over a large amplitude, typically to go from the open position to the blockage position. A "discrete" supply means and/or "discrete" discharge means for the actuating fluid is used to move the rods and pistons of certain cylinders over a small amplitude, the ring gate then moving an insignificant or nonexistent distance.

Each cylinder 11, 12, 21, 22, 31 or 32 is equipped with a sensor 11.5, 12.5 and equivalent means adapted to emit signals representative of the position of the respective pistons 11.4, 12.4 and equivalent means in direction Y. As shown in FIG. 1, the steering unit 4 is electrically connected to each sensor 11.5, 12.5 and equivalent means, so as to collect said signals.

The steering unit 4 is suitable for steering each distributor 74, 75 or 76, taking into account the position deviations, in direction Y, between the pistons 11.4 and 12.4 of cylinders 11 and 12 belonging to a same group 10, 20 or 30. In other words, each distributor 74, 75 or 76 makes it possible to precisely synchronize the pistons of the cylinders belonging to a same group.

The steering unit 4 is suitable for steering the proportional distributors 71, 72 and 73 serving as continuous supply and/or continuous discharge means for the actuating fluid for the respective cylinders 11-12, 21-22, or 31-32, taking into account the position deviations between the pistons of cylinders belonging to separate groups such as 10 and 20, such as the cylinders 11 and 21. In other words, each proportional distributor 71, 72 or 73 makes it possible to precisely synchronize the pistons of cylinders belonging to separate groups.

The proportional distributors 71, 72 and 73 and the distributors 74, 75 and 76 make it possible to ensure great precision in the hydraulic synchronization of the distances traveled by the pistons 11.4, 12.4 and equivalent means of the cylinders 11, 12, 21, 22, 31 and 32, as a supplement to the hydraulic synchronization done by the ducts 10.1, 20.1 and 30.1 and the mechanical synchronization done by the stiffness of the ring gate 2.

Figure 8:
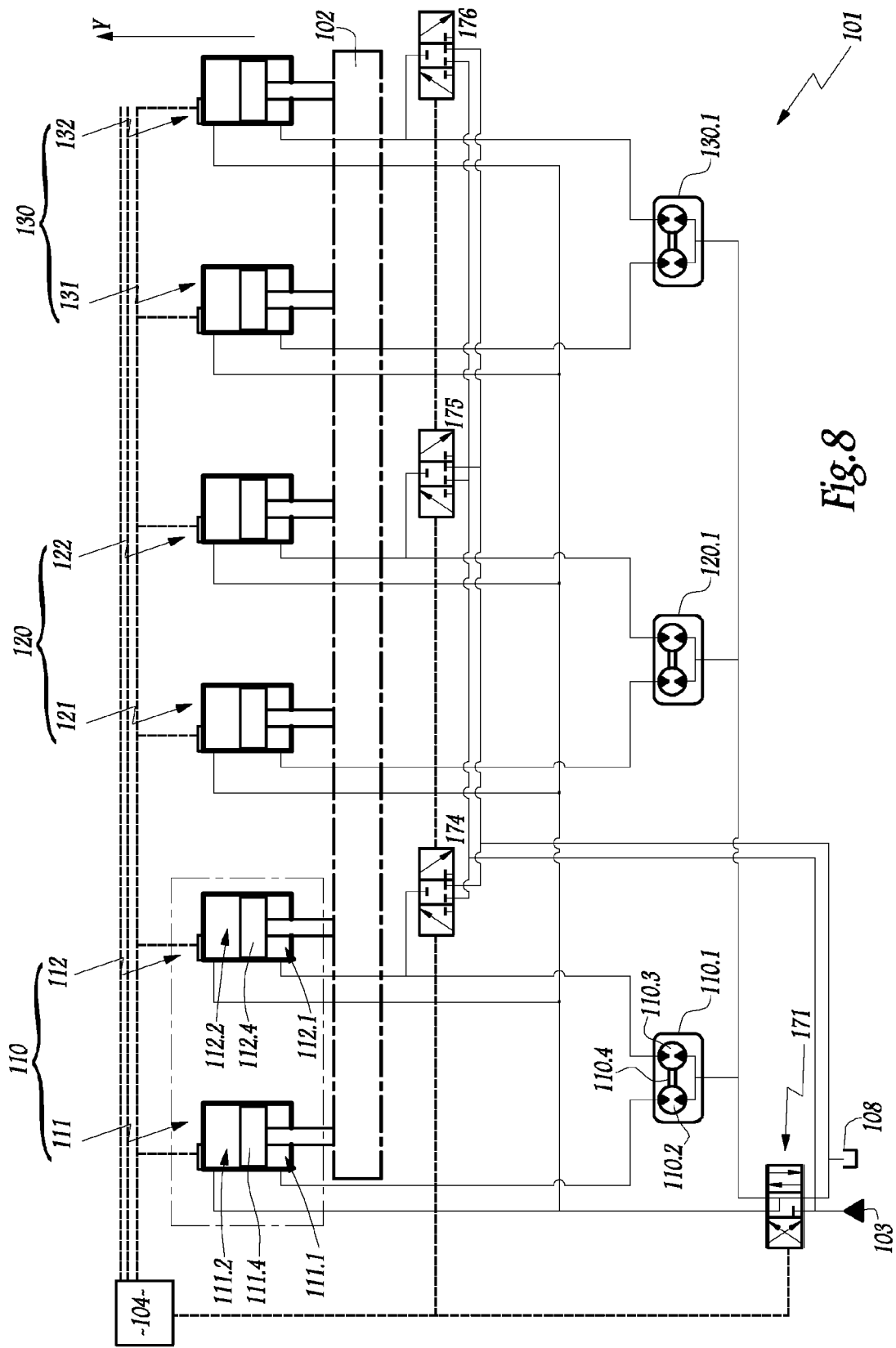
FIG. 8 is a view similar to FIG. 1 illustrating a control device according to a second embodiment of the invention.

FIG. 8 illustrates a device 101 according to a second embodiment of the invention. The description of the device 1 provided above may be transposed to the device 101, with the exception of the notable differences mentioned below. Elements of the device 101 that are identical or correspond to elements of the device 1 bear the same numerical references increased by 100.

Thus defined are a ring gate 102, a hydraulic fluid source 103, a steering unit 104, three groups 110, 120 and 130 with cylinders 111, 112, 121, 122, 131 and 132, each cylinder 111, 112 or equivalent means including a piston 111.4, 112.4 or equivalent means, a first chamber 111.1, 112.1 or equivalent means, and a second chamber 111.2, 112.2 or equivalent means.

The device 101 differs from the device 1, as all of the cylinders 111, 112, 121, 122, 131 and 132 have the same dimensions, in particular the cylinders 111 and 112 of a same group 110.

Furthermore, the device 101 differs from the device 1, as it only comprises a single proportional distributor 171 connected to the cylinders of the three groups 110, 120 and 130, instead of three independent proportional distributors 71, 72 and 73. The proportional distributor 171 steers the actuating fluid flows in and outside the cylinders 111, 112, 121, 122, 131 and 132, similarly to the proportional distributors 71, 72 and 73.

The device 101 differs from the device 1, as it comprises flow dividers 110.1, 120.1 and 130.1 instead of the ducts 10.1, 20.1 and 30.1. Each flow divider 110.1, 120.1 or 130.1 serves as a hydraulic synchronization member for the cylinders belonging to the corresponding group 110, 120 or 130.

The flow dividers 110.1, 120.1 and 130.1 are therefore connected to the cylinders 111, 112, 121, 122, 131 and 132 so as to form three distinct groups 110, 120 and 130 of cylinders. Each group 110, 120 or 130 encompasses two cylinders 111-112, 121-122 or 131-132 that are connected by a flow rate divider 110.1, 120.1 or 130.1. Two cylinders, such as 111-121 or 112-122 belonging to two distinct groups 110, 120 are not connected by a flow divider 110.1, 120.1 or 130.1.

The description of the structure and the operation of the flow divider 110.1 is outlined below relative to FIG. 8. Inasmuch as the flow dividers 102.1 and 130.1 are identical or similar to the flow divider 110.1, the description of the flow divider 110.1 may be transposed to the flow dividers 102.1 and 130.1.

The flow divider 110.1 includes two hydraulic motors 110.2 and 110.3, as well as a shared shaft 110.4. The hydraulic motor 110.2 is connected to the first chamber 111.1 of the cylinder 111. The hydraulic motor 110.3 is connected to the first chamber 112.1 of the cylinder 112.

The shared shaft 110.4 mechanically connects the hydraulic motors 110.2 and 110.3 to one another, such that the hydraulic motors 110.2 and 110.3 have the same speed of rotation around the shared shaft 110.4. In this way, the actuating fluid flow rate in the hydraulic motor 110.2 is equal to the actuating fluid flow rate in the hydraulic motor 110.3. Therefore, the actuating fluid flow rate flowing toward or from the first chamber 111.1 is equal to the actuating fluid flow rate flowing toward or from the first chamber 112.1. As a result, the hydraulic synchronization member formed by the flow rate divider 110.1 synchronizes the distances traveled by the pistons 111.4 and 112.4 in direction Y.

As an alternative to the flow dividers, the hydraulic synchronization members may be formed by quantity or volume dividers, for example by linear dividers each including a cylinder with multiple chambers whereof a rod simultaneously actuates several pistons.

According to one alternative of the invention that is not shown, the control device of FIG. 1 may comprise a single proportional distributor that is shared by the different groups, instead of three proportional distributors. Conversely, according to another alternative that is not shown, instead of a shared proportional distributor, the control device of FIG. 8 may comprise three proportional distributors, at a rate of one per group.

According to other alternatives of the invention that are not shown:
the surfaces of the pistons may not be flat, but may for example be curved or warped;
the ring gate may have a cylindrical annular shape with a non-circular base, for example an elliptical base, a non-cylindrical annular shape, for example prismatic with a square base;
the rods are not directly fastened to the ring gate, but are connected thereto by respective mechanical connecting members such as nuts;
the main direction of movement of the ring gate may be horizontal, or oblique, rather than vertical;
at least one group may encompass three or more cylinders; in one alternative where three cylinders form a group, two ducts connect said three cylinders serially; the difference between the squares of the inner diameters of two consecutive cylinders is equal to the square of the diameter of the rod of the cylinder with the largest diameter;
two separate groups may comprise different numbers of cylinders;
at least one hydraulic synchronization member may be provided only to connect two cylinders to one another in case of emergency, when the ring gate must be closed quickly; during normal use, these two cylinders are not connected by said hydraulic member.

A device according to the present invention therefore performs very precise synchronization between its cylinders owing to their hydraulic synchronization and their mechanical synchronization. A device according to the present invention is easy to adjust and requires little maintenance. A hydraulic machine according to the invention is therefore reliable.

What is claimed is:

1. A device, which controls the movement of a ring gate of a hydraulic machine comprising a paddle wheel, the ring gate defining a closed contour and being movable between an open position and a blockage position of at least one water supply channel of the paddle wheel,
the device comprising at least four dual-action hydraulic cylinders, each cylinder comprising:
a rod,
a piston,
a first chamber, and
a second chamber,
the first chamber and the second chamber being suitable for receiving an actuating fluid, the piston being connected to the rod so as to separate the first chamber from the second chamber, the first chamber being situated on the side of the rod relative to the piston and the second chamber being situated on the side opposite the rod relative to the piston, the rods being suitable for being connected to the ring gate at locations located on a perimeter adapted to coincide with the contour of the ring gate,
the device including at least two hydraulic members for synchronizing the distances traveled by the pistons in the main direction of movement of the ring gate, the hydraulic synchronization members being connected to the cylinders so as to form at least two separate groups of cylinders, each group encompassing at least two cylinders connected by at least one hydraulic synchronization member, cylinders belonging to two distinct groups not being connected by a hydraulic synchronization member, and
wherein two consecutive ones of the locations on the perimeter correspond to cylinders belonging to two separate groups.

2. The device according to claim 1, wherein the locations on the perimeter are distributed on the perimeter so that the stiffness of the ring gate contributes to synchronizing the distances traveled by the pistons belonging to separate groups, in the main direction of movement of the ring gate.

3. The device according to claim 1, wherein at least one hydraulic synchronization member includes a duct arranged to serially connect at least two cylinders belonging to a same group, said hydraulic synchronization member being adapted for the actuating fluid to flow from the first chamber of a first cylinder toward the second chamber of a second cylinder, the second cylinder being consecutive to the first cylinder in their group, the area of the surface of the piston delimiting the first chamber of the first cylinder being approximately equal to the area of the surface of the piston delimiting the second chamber of the second cylinder.

4. The device according to claim 1, wherein the number of cylinders is comprised between 5 and 30.

5. The device according to claim 1, wherein the groups encompass the same number of cylinders.

6. The device according to claim 4, wherein said device comprises at least three groups of cylinders and wherein each group encompasses two cylinders.

7. The device according to claim 6, wherein the locations are uniformly distributed on said perimeter, wherein said perimeter is in the shape of a circle, and wherein the locations corresponding to the two cylinders of a group are diametrically opposite.

8. The device according to claim 1, wherein the first chamber and the second chamber of each cylinder are generally in the shape of cylinders with circular bases.

9. The device according to claim 3, wherein the first chamber and the second chamber of each cylinder are generally in the shape of cylinders with circular bases, and wherein, for a first cylinder and a second cylinder belonging to a same group, the difference between the square of the inner diameter of the first cylinder and the square of the inner diameter of the second cylinder is equal to the square of the diameter of the rod of the first cylinder.

10. The device according to claim 1, further comprising a steering unit and a plurality of distributors controlled by the steering unit to supply and discharge an actuating fluid for each cylinder, and wherein each cylinder is equipped with at least one sensor suitable for emitting signals representative of the position of the corresponding piston in the direction of actuation of the cylinder, the steering unit being arranged to collect said signals and to control the distributors taking into account position deviations, in the main direction of movement of the ring gate, between cylinders belonging to a same group.

11. The device according to claim 10, wherein the distributors comprise proportional distributors capable, wherein the steering unit is adapted to control the proportional distributors taking into account the position deviations between cylinders belonging to separate groups.

12. A hydraulic machine, of the turbine, pump, or paddle wheel pump type, comprising a paddle wheel and a ring gate movable between an open position and a blockage position of at least one water supply channel of the paddle wheel, the hydraulic machine being characterized in that it also comprises a device according to claim 1.

\* \* \* \* \*